US012691866B2

(12) United States Patent
Xie et al.

(10) Patent No.: US 12,691,866 B2
(45) Date of Patent: Jul. 28, 2026

(54) HYBRID VEHICLE ENERGY BALANCE CONTROL SYSTEM FOR CO2 REDUCTION

(71) Applicant: FCA US LLC, Auburn Hills, MI (US)

(72) Inventors: Zhentao Xie, Auburn Hills, MI (US); Alessandro Lelli, Turin (IT); Paolo Olivieri, Pecetto Torinese (IT); Rudolf Kharpuri, Auburn Hills, MI (US); Giuseppe Corallo, Turin (IT); Pier Luca DiGristina, Turin (IT); Dario Morina, Turin (IT); Federico de Bosio, Turin (IT)

( * ) Notice: Subject to any disclaimer, the term of this patent is extended or adjusted under 35 U.S.C. 154(b) by 322 days.

(21) Appl. No.: 18/489,123

(22) Filed: Oct. 18, 2023

(65) Prior Publication Data

US 2025/0128693 A1 Apr. 24, 2025

(51) Int. Cl.
*B60W 20/16* (2016.01)
*B60K 6/40* (2007.10)
*B60W 20/13* (2016.01)

(52) U.S. Cl.
CPC .............. *B60W 20/16* (2016.01); *B60K 6/40* (2013.01); *B60W 20/13* (2016.01); *B60W 2510/244* (2013.01); *B60W 2510/246* (2013.01); *B60W 2710/244* (2013.01)

(58) Field of Classification Search
CPC ................. B60W 20/16; B60W 20/13; B60W 2510/244; B60W 2510/246; B60W 2710/244; B60K 6/40
USPC ......................................................... 701/22
See application file for complete search history.

(56) References Cited

U.S. PATENT DOCUMENTS 11,784,559 B2 * 10/2023 Leroy ........................ H02J 1/14
                                                     323/282
2007/0124037 A1 5/2007 Moran
2018/0009434 A1 * 1/2018 Hayakawa ............... B60K 6/46
(Continued)

FOREIGN PATENT DOCUMENTS

JP 2017225320 A * 12/2017
JP 2020089031 A * 6/2020

OTHER PUBLICATIONS

International Search Report and Written Opinion dated Jan. 23, 2025 for International Application No. PCT/US2024/051484, International Filing Date Oct. 18, 2023.

*Primary Examiner* — Isaac G Smith
(74) *Attorney, Agent, or Firm* — Jeremy J. Klobucar

(57) ABSTRACT

A hybrid electric vehicle (HEV) includes an internal combustion engine, an electric traction motor, a belt starter generator (BSG) unit, a low voltage battery system including a low voltage battery, and a high voltage battery system including a high voltage traction battery. A DC/DC converter is configured to convert high voltage from the high voltage battery system into low voltage to charge the low voltage battery and support low voltage loads. A powertrain control system configured for reducing HEV CO2 emissions includes a controller configured to control an output voltage setpoint of the DC/DC converter and the BSG unit. The controller is configured to selectively increase or decrease the output voltage setpoints of the DC/DC converter and/or the BSG unit to reduce high voltage battery power consumption to thereby avoid or delay turning on the internal combustion engine to reduce CO2 emissions.

17 Claims, 4 Drawing Sheets

(56)         References Cited

U.S. PATENT DOCUMENTS

| | | | |
|---|---|---|---|
| 2018/0102702 A1* | 4/2018 | Ahn | ........................ H02P 25/08 |
| 2019/0285041 A1* | 9/2019 | Chen | ................... F02N 11/0862 |

\* cited by examiner

HYBRID VEHICLE ENERGY BALANCE CONTROL SYSTEM FOR CO2 REDUCTION

FIELD

The present application relates generally to hybrid vehicle control systems and, more particularly, to an energy balance control system and method for reducing hybrid vehicle $CO_2$ emissions.

BACKGROUND

A hybrid-electric vehicle (HEV) powertrain typically includes an internal combustion engine and one or more electric motors. The electrified portion of the hybrid-electric powertrain vehicle often includes a high voltage battery system and a low voltage (e.g., 12 volt) battery system. In such a configuration, the high voltage battery system is utilized to power the electric motor and power/recharge the low voltage battery system via a direct current to direct current (DC/DC) converter. The high voltage battery system may be recharged via regenerative braking or turning on the engine. However, operating the engine to recharge the high voltage battery system generates $CO_2$ emissions. Accordingly, while such conventional systems do work well for their intended purpose, there is a desire for improvement in the relevant art.

SUMMARY

In accordance with one example aspect of the invention, a hybrid electric vehicle (HEV) is provided. In one example implementation, the HEV includes an internal combustion engine, an electric traction motor, a belt starter generator (BSG) unit configured to start the internal combustion engine, a low voltage battery system including a low voltage battery electrically coupled to the BSG unit, and a high voltage battery system including a high voltage traction battery configured to power the electric traction motor. A DC/DC converter is configured to convert high voltage from the high voltage battery system into low voltage to charge the low voltage battery and support low voltage loads. A powertrain control system configured for reducing HEV $CO_2$ emissions includes a controller configured to control an output voltage setpoint of the DC/DC converter and the BSG unit. The controller is configured to selectively increase or decrease the output voltage setpoints of the DC/DC converter and/or the BSG unit to reduce high voltage battery power consumption to thereby avoid or delay turning on the internal combustion engine to reduce $CO_2$ emissions.

In addition to the foregoing, the described HEV may include one or more of the following features: wherein the powertrain control system further includes an auxiliary power module (APM) in signal communication with the controller and configured to control the output voltage setpoint of the DC/DC converter, and a motor control processor (MCP) in signal communication with the controller and configured to control the output voltage setpoint of the BSG unit; and wherein the powertrain control system further includes a sensor system configured to monitor a temperature and state of charge (SOC) of the low voltage battery, and a body control module (BCM) in signal communication with the sensor system and the controller.

In addition to the foregoing, the described HEV may include one or more of the following features: wherein the controller is programmed to maintain a state of charge (SOC) of the low voltage battery within a predefined range to reduce $CO_2$ emissions, including (i) monitoring the low voltage battery SOC to determine an increase or decrease in the SOC, (ii) increasing the output voltage setpoints for the DC/DC converter and/or the BSG unit when the low voltage battery SOC is increasing within the predefined range to thereby charge the low voltage battery, and (iii) decreasing the output voltage setpoint of the DC/DC converter and/or the BSG unit when the low voltage battery SOC is decreasing within the predefined range to thereby discharge the low voltage battery; and wherein the controller is further programmed to periodically fully recharge the low voltage battery.

In addition to the foregoing, the described HEV may include one or more of the following features: wherein the controller is programmed to adjust the output voltage setpoint of the DC/DC converter based on a condition of the high voltage traction battery, including (i) monitoring the high voltage traction battery to determine if a power usage thereof is greater than a predetermined threshold, and (ii) decreasing the output voltage setpoint of the DC/DC converter when the power usage is greater than the predetermined threshold, to thereby conserve high voltage traction battery energy; and wherein the controller is programmed to adjust the output voltage setpoint of the DC/DC converter based on a performance of the DC/DC converter, including (i) monitoring the DC/DC converter for a derating or saturation condition, and (ii) decreasing the output voltage setpoint of the DC/DC converter when the DC/DC converter has the derating or saturation condition.

In addition to the foregoing, the described HEV may include one or more of the following features: wherein the controller is programmed to adjust the output voltage setpoints of the DC/DC converter and/or BSG unit to meet high-power requests, including (i) monitoring low voltage devices powered by the low voltage battery system for high-power requests, and (ii) increasing the output voltage setpoints of the DC/DC converter and/or BSG unit to meet the high-power requests; and wherein the controller is programmed to increase the output voltage setpoint and a corresponding voltage ramping rate of the DC/DC converter for transition from an EV mode to a hybrid mode of the HEV, including (i) determining the HEV is operating in the EV mode where the engine is off, and (ii) increasing the output voltage setpoint and corresponding voltage ramping rate of the DC/DC converter to provide sufficient power for an engine start when transitioning to the hybrid mode.

In accordance with another example aspect of the invention, a method of operating a powertrain control system to reduce $CO_2$ emissions of a hybrid electric vehicle (HEV) is provided. The HEV includes an internal combustion engine, an electric traction motor, a belt starter generator (BSG) unit, a low voltage battery, a high voltage traction battery, and a DC/DC converter. In one example implementation, the method includes selectively increasing or decreasing an output voltage setpoint voltage of the DC/DC converter and/or the BSG unit to reduce high voltage battery power consumption to thereby avoid or delay turning on the internal combustion engine to reduce $CO_2$ emissions.

In addition to the foregoing, the described method may include one or more of the following features: maintaining a state of charge (SOC) of the low voltage battery within a predefined range to reduce $CO_2$ emissions, including (i) monitoring the low voltage battery SOC to determine an increase or decrease in the SOC, (ii) increasing the output voltage setpoints for the DC/DC converter and/or the BSG unit when the low voltage battery SOC is increasing within the predefined range to thereby charge the low voltage battery, and (iii) decreasing the output voltage setpoint of the DC/DC converter and/or the BSG unit when the low voltage battery SOC is decreasing within the predefined range to thereby discharge the low voltage battery; and periodically fully recharging the low voltage battery.

In addition to the foregoing, the described method may include one or more of the following features: adjusting the output voltage setpoint of the DC/DC converter based on a condition of the high voltage traction battery, including (i) monitoring the high voltage traction battery to determine if a power usage thereof is greater than a predetermined threshold, and (ii) decreasing the output voltage setpoint of the DC/DC converter when the power usage is greater than the predetermined threshold, to thereby conserve high voltage traction battery energy; and adjusting the output voltage setpoint of the DC/DC converter based on a performance of the DC/DC converter, including (i) monitoring the DC/DC converter for a derating or saturation condition, and (ii) decreasing the output voltage setpoint of the DC/DC converter when the DC/DC converter has the derating or saturation condition.

In addition to the foregoing, the described method may include one or more of the following features: adjusting the output voltage setpoints of the DC/DC converter and/or BSG unit to meet high-power requests, including (i) monitoring low voltage devices powered by the low voltage battery system for high-power requests, and (ii) increasing the output voltage setpoints of the DC/DC converter and/or BSG unit to meet the high-power requests; and increasing the output voltage setpoint and a corresponding voltage ramping rate of the DC/DC converter for transition from an EV mode to a hybrid mode of the HEV, including (i) determining the HEV is operating in the EV mode where the engine is off, and (ii) increasing the output voltage setpoint and corresponding voltage ramping rate of the DC/DC converter to provide sufficient power for an engine start when transitioning to the hybrid mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, the hybrid electric vehicle (HEV) powertrain includes a high voltage battery system and a low voltage battery system. The low voltage battery system can be powered/recharged by the DC/DC converter or a 12V belt starter generator. The high voltage battery system can be recharged via regenerative braking or turning the engine on. However, operating the engine to recharge the high voltage battery system generates undesirable $CO_2$ emissions. Accordingly, described herein are systems and methods providing energy balance controls for the low voltage battery system to reduce $CO_2$ emissions of a mild HEV.

Figure 1:
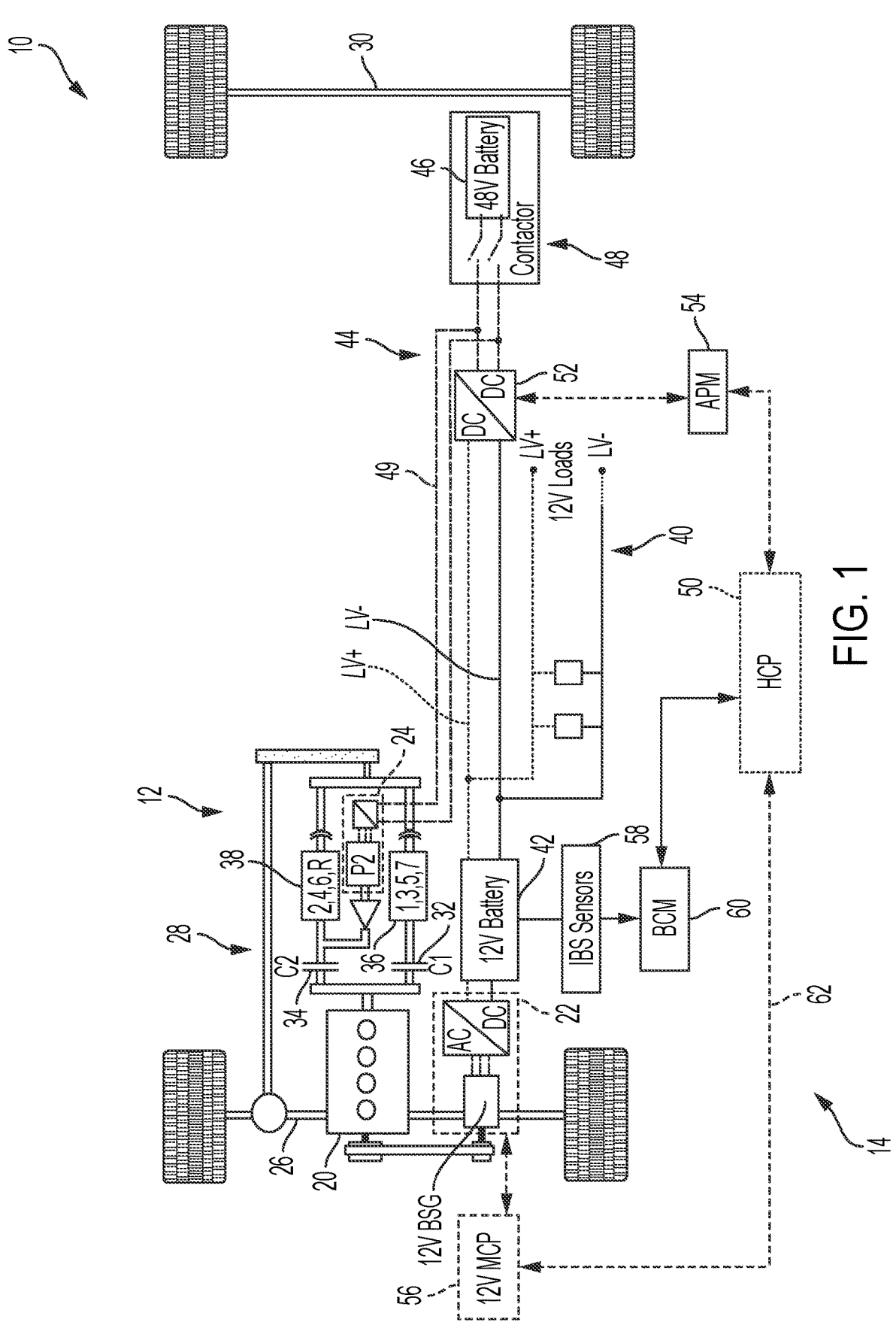
FIG. 1 is a schematic illustration of an example mild hybrid electric vehicle architecture in accordance with the principles of the present application.

With initial reference to FIG. 1, a schematic diagram of a mild hybrid electric vehicle (HEV) 10 is illustrated having a hybrid powertrain 12 and a powertrain control system 14 according to example implementations of the disclosure. In the illustrated example, the powertrain 12 generally includes an internal combustion engine 20 and two electric motors, including a low voltage (e.g., 12V) belt-driven starter generator (BSG) and inverter unit 22 (e.g., P1 motor), and a higher voltage (e.g., 48V) electric traction motor 24 (e.g., P2 motor).

The engine 20 combusts a mixture of air and fuel (e.g., gasoline) within cylinders to drive pistons and generate drive torque to a front axle 26 via a transmission 28. The P1 electric motor of the BSG unit 22 is utilized to control engine stop/start operations to improve vehicle fuel economy, and the P2 electric traction motor 24 is configured to selectively provide drive torque to the front axle 26 and/or a rear axle 30. In the example embodiment, the transmission 28 is a hybrid dual clutch transmission that generally includes a first clutch 32, a second clutch 34, a first sub-transmission 36 with odd gear ratios, and a second sub-transmission 38 with even gear ratios. It will be appreciated, however, that transmission 28 may have any suitable configuration that enables HEV 10 to function as described herein.

To provide electric power, the HEV 10 includes a low voltage battery system 40 having a 12V battery 42, and a high voltage battery system 44 having a 48V traction battery 46. The low voltage battery system 40 is configured to support various 12V loads of the HEV 10, for example, to power various electrical components or start the engine 20. The high voltage battery system 44 is configured to power high voltage loads such as the P2 traction motor 24 and DC/DC converter. A contactor 48 is included as an electro-mechanical switching device utilized to selectively connect the 48V traction battery 46 to a high voltage bus 49 of the high voltage battery system 44. In some examples, the contactor 48 is integrated with the 48V traction battery 46. In general, the P2 electric traction motor 24 is powered by the 48V battery system 44, and the low voltage BSG unit 22 is powered by the 12V battery system 40 and/or the 48V battery system 44.

In the example embodiment, the hybrid powertrain 12 is controlled by the powertrain control system 14, which generally includes a hybrid control processor (HCP) or controller 50, a DC/DC converter 52, an auxiliary power module (APM) 54, the 12V BSG unit 22, a 12V motor control processor (MCP) 56, an intelligent battery sensor (IBS) system 58, and a body control module (BCM) 60.

The controller 50 is a central supervisory control configured to communicate with various components/modules of the hybrid powertrain 12 via a CAN bus 62. The DC/DC converter 52 is an actuator configured to convert high voltage (e.g., 48V) to low voltage (e.g., 12V) to charge the 12V battery 42 and support various 12V loads of the HEV 10. The APM 54 is a controller that controls the DC/DC converter 52. The APM 54 can monitor a status of the DC/DC converter 52 such as operation mode and failure status. The APM 54 can further measure an input and output current and voltage of the DC/DC converter 52. In addition, the APM 54 can control the DC/DC converter 52 to operate in a specific mode (e.g., boost mode, etc.) and/or reach specific voltage setpoints. The APM 54 can bi-directionally communicate with the hybrid controller 50 via the CAN bus 62. In this regard, the controller 50 can control and monitor the DC/DC converter 52 through the APM 54.

The BSG unit 22 is an actuator configured to be utilized as a starter when the HEV 10 needs to crank the engine 20. The BSG unit 22 is configured to operate in an alternator mode to charge the 12V battery 42 and support 12V loads while the engine 20 is running. The 12V BSG unit 22 is directly controlled by the 12V MCP 56, which is a controller configured for bi-directional communication with the controller 50 via the CAN bus 62. The controller 50 is configured to control the 12V BSG unit 22 by forwarding signals, such as operation state, torque command, and voltage setpoints to the 12V MCP 56, and the 12V MCP 56 provides feedback signals to the controller 50 related to the 12V BSG unit 22 such as operation status, output current, and voltage.

In the example embodiment, the IBS system 58 includes one or more sensors configured to monitor various conditions of the 12V battery 42 such as, for example, temperature, voltage, current, and state of charge (SOC). The IBS system 58 is in signal communication with the BCM 60. In this way, the IBS system 58 is configured to forward the 12V battery measurement signals to the BCM 60 via CAN bus 62 or alternatively a LIN bus. The BCM 60 is configured to receive the IBS system signals and forward them to the controller 50 via the CAN bus 62.

In operation, the powertrain control system 14 is configured to perform energy balance control of the low voltage battery system 40 to reduce $CO_2$ emissions during operation of the HEV 10. More specifically, during the $CO_2$ reduction operation, the powertrain control system 14 is configured to perform at least one of six functions. In general, functions 1, 3, and 4 are configured to reduce output voltage setpoints for $CO_2$ reduction. Functions 2, 5, and 6 are configured to increase output voltage setpoints to facilitate protecting the battery and fulfilling vehicle power requirement. The six functions operate together to achieve energy balance control for $CO_2$ reduction. In this way, for low/medium power request operations, the output voltage setpoint is reduced to thereby decrease $CO_2$ emissions. For high-power request operations, the output voltage setpoint is increased to meet power requirements. Since high-power request operations are infrequent, overall driving operation results in $CO_2$ reduction.

In the example embodiment, the first function includes maintaining the 12V battery SOC within a predefined calibratable range for normal 12V battery conditioning. During the first function, the controller 50 monitors the 12V battery SOC via signals from the IBS system 58 and BCM 60. When the controller 50 determines the 12V battery SOC is increasing from a minimum SOC to a maximum SOC of the predefined range, the controller 50 commands higher output voltage setpoints (desired voltage output) for the DC/DC converter 52 and/or BSG unit 22 to charge the 12V battery 42. When the controller 50 determines the 12V battery SOC is decreasing from the maximum SOC to the minimum SOC of the predefined range, the controller 50 commands lower output voltage setpoints such that the 12V battery 42 can be discharged.

In one example, the system may have a nominal output voltage setpoint, and the higher output voltage setpoint is greater than the nominal output voltage setpoint. Similarly, the lower output voltage setpoint is less than the nominal output voltage setpoint. For example, the nominal output voltage setpoint may be 13.5V, the higher output voltage setpoint is greater than 13.5V (e.g., 14.5V), and the lower output voltage setpoint is less than 13.5V (e.g., 12.5V). In some examples, the setpoints are at least partially determined by a temperature of the 12V battery 42. For example, at low temperatures (e.g., <5° C.), the setpoint is increased to prevent battery damage and enable 12V charging, while at high temperatures (e.g., >50° C.), the setpoint is decreased to prevent damage and enable 12V charging without overheating.

In one example implementation, the desired predefined range for the 12V battery SOC is between 80% and 90%, for example, since it takes more energy to maintain the 12V battery SOC above 90%. If the controller 50 determines the 12V battery SOC is increasing from 80% to 90%, the controller 50 commands a higher first output voltage setpoint (e.g., 14.5V). If the controller 50 determines the 12V SOC is decreasing from 90% to 80%, the controller 50 commands a lower second output voltage setpoint (e.g., 12.5V).

The second function includes periodically fully recharging the 12V battery 42 (100% SOC) to maintain full capacity and avoid damage. This is done, for example, so the 12V battery 42 does not lose a higher state of charge (e.g., 90-100%) when the SOC is maintained within the predefined range (e.g., 80-90%) established by the first function. During the second function, the controller 50 monitors the 12V battery 42 via signals from the IBS system 58 and BCM 60 to determine when a predetermined recharge phase should be initiated. When the recharge phase is initiated, the controller 50 commands higher output voltage setpoints for the DC/DC converter 52 and/or BSG unit 22 to charge the 12V battery 42. Each recharge phase has a predefined time period, which can cross multiple driving key cycles. The recharge phase ends when the predefined time period expires or the 12V battery SOC exceeds a predetermined threshold (e.g., 99%).

When an active recharge phase ends, the controller 50 evaluates the final SOC of the 12V battery 42. Based on the evaluation, the controller 50 then determines a next time period for a new recharge phase (Next Period of Recharge Phase), for example based on a calibration table, and saves the new recharge phase time period in its memory. For example, if the final SOC at the end of the recharge phase is 100%, the controller 50 may set the next recharge phase to begin in thirty days. If the final SOC at the end of the recharge phase is 95%, the controller may set the next recharge phase to begin in twenty-five days.

The third function includes adjusting the output voltage setpoints of the DC/DC converter 52 based on the conditions of the 48V traction battery 46. When the controller 50 determines the 48V traction battery power usage is greater than a predetermined threshold (e.g., 1.1 KW), the controller 50 commands a lower output voltage setpoint for the DC/DC converter 52. In some examples, the predetermined threshold of power usage is based on the 48V traction battery SOC. The third function is configured to conserve the 48V traction battery's energy, which reduces the need to restart the engine 20, thereby decreasing $CO_2$ emissions.

The fourth function includes adjusting the output voltage setpoint of the DC/DC converter 52 based on the performance thereof. When the controller 50 determines the DC/DC converter 52 is derating or saturated and cannot fully function, the controller 50 commands a lower output voltage setpoint for the DC/DC converter 52. As such, the fourth function is configured to prevent discharge of the 48V traction battery energy when the DC/DC converter 52 is derating or saturated. This conserves the 48V traction battery's energy, which reduces the need to restart the engine 20, thereby decreasing CO2 emissions.

The fifth function includes adjusting the output voltage setpoints of the DC/DC converter 52 and/or BSG unit 22 to meet high power requests. If controller 50 determines high-power performance is requested for any 12V devices (e.g., AC blower, engine radiator fan, etc.), the controller 50 commands increased output voltage setpoints of the DC/DC converter 52 and/or BSG unit 22 to meet the power request. In one example embodiment, the increased output voltage setpoints are based on the formula: max (Based Value, Device 1 Request, Device 2 Request, . . . ). The formula is configured to arbitrate and output maximum voltage set-point. The Based Value is calculated from the first through fourth functions, which could be a low value for CO2 reduction. The Device # Request is a voltage setpoint value converted from the device power request to meet the high-power performance. For example, if the Based Value is 12.5V according to functions 1-4, Device 1 Request is 13.5V, and Device 2 Request is 14V, the final setpoint value is 14V as it is the max value.

The sixth function includes increasing the output voltage setpoint of the DC/DC converter 52 and increasing a cor-responding voltage ramping rate for EV to hybrid mode transition. In EV mode, the HEV 10 utilizes the P2 traction motor 24 while the engine 20 is off. In the hybrid mode, the P2 traction motor 24 and engine 20 are both utilized. In the sixth function, when the vehicle is driving in EV mode, the controller 50 commands an increased output voltage setpoint of the DC/DC converter 52 to provide sufficient power for engine auto start when the hybrid mode is requested. At the same time, the controller 50 also commands an increased ramping rate of the DC/DC converter 52, which is greater than a normal ramping rate, to quickly reach a voltage target for engine start.

Figure 2A:
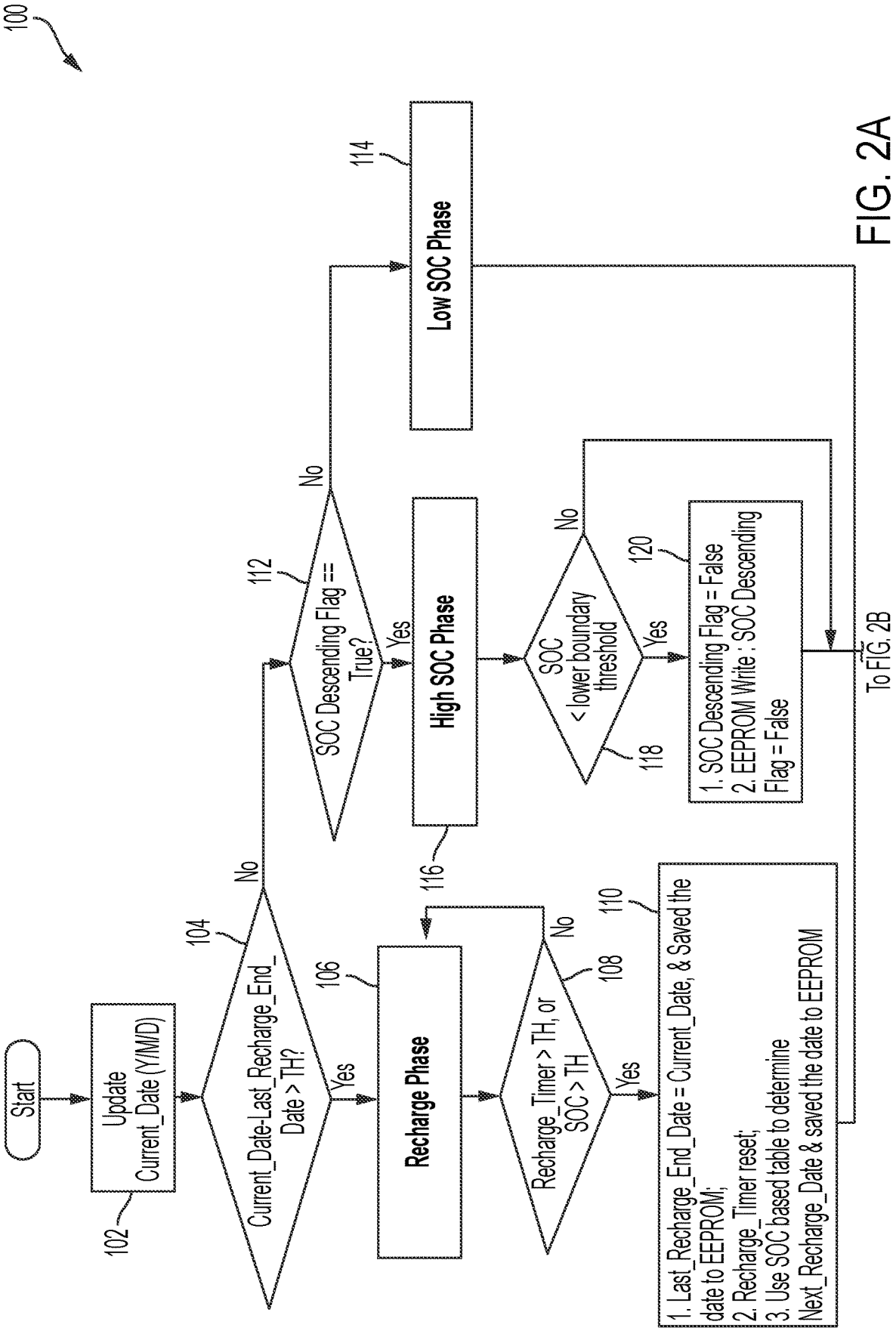
FIGS. 2A-2C illustrate an example control logic flow for operating an electrified powertrain system of the mild HEV shown in FIG. 1, in accordance with the principles of the present application.
Figure 2B:
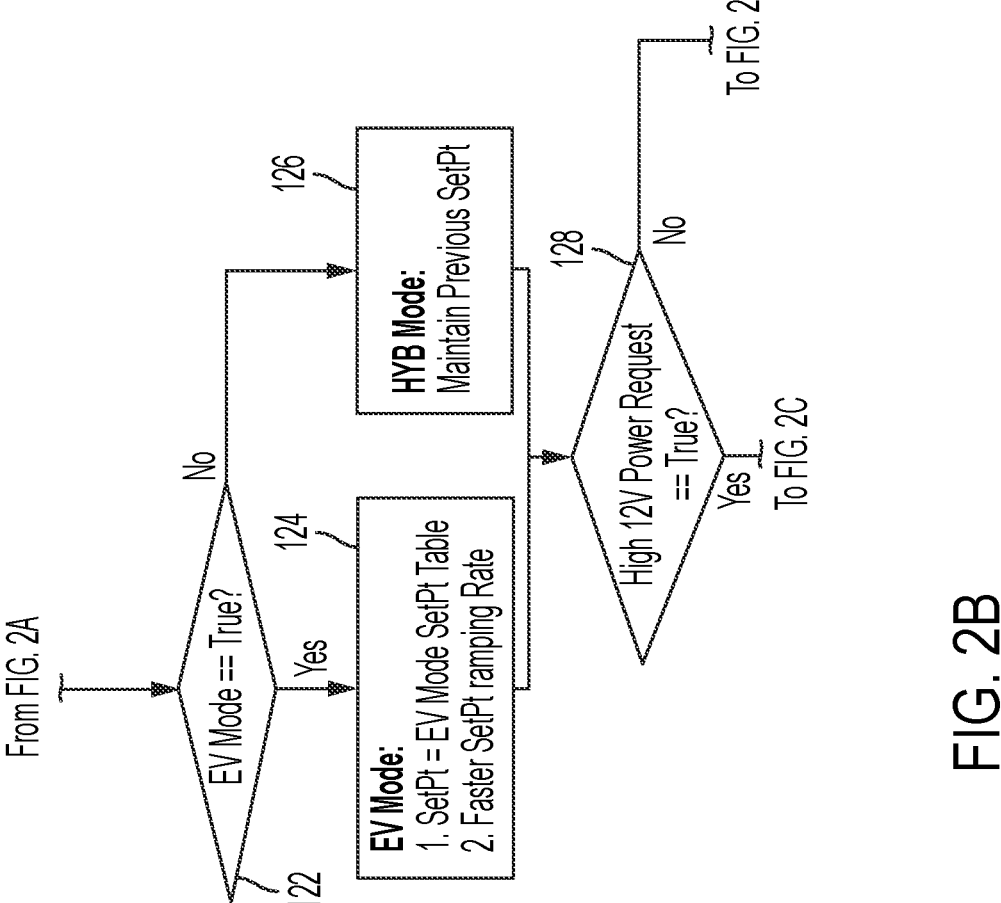
Figure 2C:
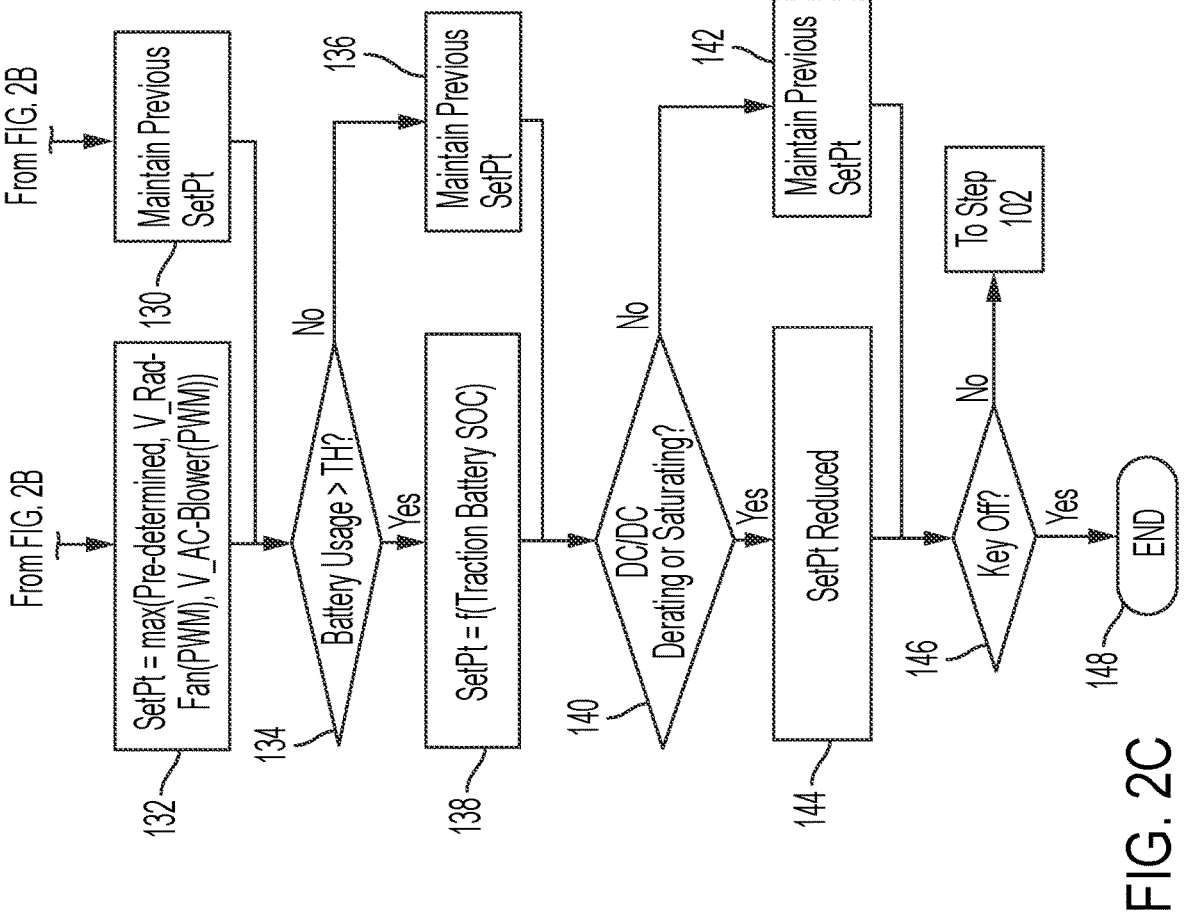

With reference now to FIGS. 2A-2C, an example control logic flow 100 for operating the powertrain control system 14 to reduce CO2 emissions in HEV 10 is provided. At step 102, control (e.g., controller 50) detects a vehicle key-on, and subsequently updates a Current Date (day/month/year), for example based on GPS signals. At step 104, control determines if a recharge of the 12V battery 42 (recharge phase) is required, for example, by determining a difference between the Current Date and a Last Recharge End Date. If the difference is greater than the previously determined Next Period of Recharge phase, a recharge phase is required and control proceeds to step 106. If no, control proceeds to step 112.

At step 106, control begins to fully recharge the 12V battery 42. During the recharge phase, a Recharge Timer is set and begins to count down until expired. The Recharge Timer can be saved in the controller 50 memory such that the recharge phase may be continued for the next key cycle if the recharge is not completed. At step 108, control determines if the Recharge Timer is expired or the 12V battery SOC has exceeded a predetermined threshold (e.g., 99%). If no, control returns to step 108. If yes, control proceeds to step 110 and terminates the recharge phase. Control then updates the Last Recharge End Date as the Current Date and saves to the memory (e.g., EEPROM). Control then resets the Recharge Timer to zero and evaluates the 12V battery SOC to determine the Next Period of Recharge Phase (e.g., via the calibration table). Control then proceeds to step 122.

Returning to step 104, if the recharge phase is not required, control proceeds to step 112 and a SOC Descend-ing Flag value is determined based on the software hyster-esis, as previously described in the first function. In this step, control determines if the 12V battery SOC is increasing or decreasing within a predefined range (e.g., 80-90%). If the 12V battery SOC is increasing from a range min value (e.g., 80%) to a range max value (e.g., 90%), the SOC Descending Flag equals FALSE and control proceeds to step 114. If the 12V battery SOC is decreasing from a range max value (e.g., 90%) to a range min value (e.g., 80%), the SOC Descending Flag equals TRUE and control proceeds to step 116.

At step 114, due to the increasing 12V battery SOC, control increases the DC/DC converter voltage setpoint to charge the 12V battery 42. The increased voltage setpoint may be based on 12V battery temperature. The SOC Descending Flag value may then be set to FALSE and saved to the memory in order to re-enter step 114 on the next key cycle. Control then proceeds to step 122.

At step 116, due to the decreasing 12V battery SOC, control decreases the DC/DC converter voltage setpoint to discharge the 12V battery 42. The decreased voltage setpoint may be based on 12V battery temperature. The SOC Descending Flag value may then be set to TRUE and saved to the memory in order to re-enter step 116 on the next key cycle. Control then proceeds to step 118 and determines if the 12V battery SOC is below the range min value defined in step 112. If no, control proceeds to step 122. If yes, control proceeds to step 120 where control resets the SOC Descend-ing Flag to FALSE and saves the value to the memory. Control then proceeds to step 122.

At step 122, control determines if the HEV 10 is operating in EV mode (engine not running). If yes, at step 124, control increases the DC/DC converter voltage setpoint to provide sufficient power for engine auto start if hybrid mode is subsequently requested. Control also increases the voltage ramping rate above normal, such that the voltage quickly reaches the target for engine start. If no, at step 126, control maintains the predetermined DC/DC converter voltage set-points. Each of steps 124 and 126 then proceed to step 128.

At step 128, control monitors 12V components (e.g., AC blower, engine radiator fan, etc.) connected to the low voltage battery system 40 to determine if the components require high-power performance. If no, control proceeds to step 130 and maintains predetermined DC/DC converter voltage setpoints. If yes, at step 132, control adjusts DC/DC converter or BSG unit voltage setpoints based on the 12V device usage request. For example, the new voltage set-points are determined by the function: max (Pre-determined, Device 1 Request, Device 2 Request, Device n Request . . . ). Steps 130 and 132 proceed to step 134.

At step 134, control monitors the 48V traction battery 46 to determine if power usage thereof is greater than a pre-determined threshold (e.g., 1.1 KW). If no, control proceeds to step 136 and maintains predetermined DC/DC converter voltage setpoints. If yes, at step 138, control decreases the DC/DC converter voltage setpoint based on the 48V traction battery SOC to conserve traction battery power. This may be based on a lookup table charting SOC values and corre-sponding setpoints. Steps 136 and 138 proceed to step 140.

At step 140, control monitors the DC/DC converter 52 to determine if it is derating or saturating, based on feedback signals from the APM 54. If no, control proceeds to step 142 and maintains predetermined DC/DC converter voltage set-points. If yes, at step 144, control decreases the DC/DC converter voltage setpoint (e.g., 13.2V) to maintain the 12V system. Steps 142 and 144 proceed to step 146 where control determines if there is a key off condition. If yes, control ends at step 148. If no, control may return to step 102.

Described herein are systems and methods for reducing CO2 emissions in a hybrid electric vehicle. A powertrain control system monitors various components on a low voltage battery system and a high voltage battery system and selectively increases/decreases output voltage setpoints on a DC/DC converter and/or BSG unit. Such control reduces high voltage battery power consumption to thereby avoid or delay turning on a $CO_2$ producing internal combustion engine to charge the high voltage battery.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A hybrid electric vehicle (HEV), comprising:
an internal combustion engine;
an electric traction motor;
a belt starter generator (BSG) unit configured to start the internal combustion engine;
a low voltage battery system including a low voltage battery electrically coupled to the BSG unit;
a high voltage battery system including a high voltage traction battery configured to power the electric traction motor;
a DC/DC converter configured to convert high voltage from the high voltage battery system into low voltage to charge the low voltage battery and support low voltage loads; and
a powertrain control system for reducing $CO_2$ emissions of the HEV, including a controller configured to control an output voltage setpoint of the DC/DC converter and the BSG unit,
wherein the controller is configured to selectively increase or decrease the output voltage setpoints of the DC/DC converter and/or the BSG unit to reduce high voltage battery power consumption to thereby avoid or delay turning on the internal combustion engine thereby reducing $CO_2$ emissions, and
wherein the controller is programmed to maintain a state of charge (SOC) of the low voltage battery within a predefined range to reduce $CO_2$ emissions, including:
monitoring the low voltage battery SOC to determine an increase or decrease in the SOC;
increasing the output voltage setpoints for the DC/DC converter and/or the BSG unit when the low voltage battery SOC is increasing within the predefined range to thereby charge the low voltage battery; and
decreasing the output voltage setpoint of the DC/DC converter and/or the BSG unit when the low voltage battery SOC is decreasing within the predefined range to thereby discharge the low voltage battery.

2. The HEV of claim 1, wherein the powertrain control system further includes:
an auxiliary power module (APM) in signal communication with the controller and configured to control the output voltage setpoint of the DC/DC converter; and
a motor control processor (MCP) in signal communication with the controller and configured to control the output voltage setpoint of the BSG unit.

3. The HEV of claim 2, wherein the powertrain control system further includes:
a sensor system configured to monitor a temperature and state of charge (SOC) of the low voltage battery; and
a body control module (BCM) in signal communication with the sensor system and the controller.

4. The HEV of claim 1, wherein the low voltage battery predefined range is between approximately 80% SOC and approximately 90% SOC.

5. The HEV of claim 4, wherein the controller is further programmed to periodically fully recharge the low voltage battery to approximately 100% SOC, after the expiration of a predefined time period, to maintain full capacity of the low voltage battery.

6. The HEV of claim 1, wherein the controller is programmed to adjust the output voltage setpoint of the DC/DC converter based on a condition of the high voltage traction battery, including:
monitoring the high voltage traction battery to determine if a power usage thereof is greater than a predetermined threshold; and
decreasing the output voltage setpoint of the DC/DC converter when the power usage is greater than the predetermined threshold, to thereby conserve high voltage traction battery energy.

7. The HEV of claim 1, wherein the controller is programmed to adjust the output voltage setpoint of the DC/DC converter based on a performance of the DC/DC converter, including:
monitoring the DC/DC converter for a derating or saturation condition; and
decreasing the output voltage setpoint of the DC/DC converter when the DC/DC converter has the derating or saturation condition.

8. The HEV of claim 1, wherein the controller is programmed to adjust the output voltage setpoints of the DC/DC converter and/or BSG unit to meet high-performance, increased power requests, including:
monitoring low voltage devices powered by the low voltage battery system for high-performance, increased power requests; and
increasing the output voltage setpoints of the DC/DC converter and/or BSG unit to meet the high-performance, increased power requests.

9. The HEV of claim 1, wherein the controller is programmed to increase the output voltage setpoint and a corresponding voltage ramping rate of the DC/DC converter for transition from an EV mode to a hybrid mode of the HEV, including:
determining the HEV is operating in the EV mode where the engine is off; and
increasing the output voltage setpoint and corresponding voltage ramping rate of the DC/DC converter to provide sufficient power for an engine start when transitioning to the hybrid mode.

10. A method of operating a powertrain control system to reduce $CO_2$ emissions of a hybrid electric vehicle (HEV) having an internal combustion engine, an electric traction motor, a belt starter generator (BSG) unit, a low voltage battery, a high voltage traction battery, and a DC/DC converter, the method comprising:

selectively increasing or decreasing an output voltage setpoint voltage of the DC/DC converter and/or the BSG unit to reduce high voltage battery power consumption to thereby avoid or delay turning on the internal combustion engine to reduce $CO_2$ emissions; and maintaining a state of charge (SOC) of the low voltage battery within a predefined range to reduce $CO_2$ emissions, including:

monitoring the low voltage battery SOC to determine an increase or decrease in the SOC;

increasing the output voltage setpoints for the DC/DC converter and/or the BSG unit when the low voltage battery SOC is increasing within the predefined range to thereby charge the low voltage battery; and decreasing the output voltage setpoint of the DC/DC converter and/or the BSG unit when the low voltage battery SOC is decreasing within the predefined range to thereby discharge the low voltage battery.

11. The method of claim 10, wherein the low voltage battery predefined range is between approximately 80% SOC and approximately 90% SOC.

12. The method of claim 11, further comprising periodically fully recharging the low voltage battery to approximately 100% SOC, after the expiration of a predefined time period, to maintain full capacity of the low voltage battery.

13. The method of claim 10, further comprising adjusting the output voltage setpoint of the DC/DC converter based on a condition of the high voltage traction battery, including:

monitoring the high voltage traction battery to determine if a power usage thereof is greater than a predetermined threshold; and decreasing the output voltage setpoint of the DC/DC converter when the power usage is greater than the predetermined threshold, to thereby conserve high voltage traction battery energy.

14. The method of claim 10, further comprising adjusting the output voltage setpoint of the DC/DC converter based on a performance of the DC/DC converter, including:

monitoring the DC/DC converter for a derating or saturation condition; and decreasing the output voltage setpoint of the DC/DC converter when the DC/DC converter has the derating or saturation condition.

15. The method of claim 10, further comprising adjusting the output voltage setpoints of the DC/DC converter and/or BSG unit to meet high-performance, increased power requests, including:

monitoring low voltage devices powered by the low voltage battery system for high-performance, increased power requests; and increasing the output voltage setpoints of the DC/DC converter and/or BSG unit to meet the high-performance, increased power requests.

16. The method of claim 10, further comprising increasing the output voltage setpoint and a corresponding voltage ramping rate of the DC/DC converter for transition from an EV mode to a hybrid mode of the HEV, including:

determining the HEV is operating in the EV mode where the engine is off; and increasing the output voltage setpoint and corresponding voltage ramping rate of the DC/DC converter to provide sufficient power for an engine start when transitioning to the hybrid mode.

17. The method of claim 10, further comprising:

(i) maintaining a state of charge (SOC) of the low voltage battery within a predefined range to reduce $CO_2$ emissions, including:

monitoring the low voltage battery SOC to determine an increase or decrease in the SOC;

increasing the output voltage setpoints for the DC/DC converter and/or the BSG unit when the low voltage battery SOC is increasing within the predefined range to thereby charge the low voltage battery; and decreasing the output voltage setpoint of the DC/DC converter and/or the BSG unit when the low voltage battery SOC is decreasing within the predefined range to thereby discharge the low voltage battery;

(ii) periodically fully recharging the low voltage battery;

(iii) adjusting the output voltage setpoint of the DC/DC converter based on a condition of the high voltage traction battery, including:

monitoring the high voltage traction battery to determine if a power usage thereof is greater than a predetermined threshold; and decreasing the output voltage setpoint of the DC/DC converter when the power usage is greater than the predetermined threshold, to thereby conserve high voltage traction battery energy;

(iv) adjusting the output voltage setpoint of the DC/DC converter based on a performance of the DC/DC converter, including:

monitoring the DC/DC converter for a derating or saturation condition; and decreasing the output voltage setpoint of the DC/DC converter when the DC/DC converter has the derating or saturation condition;

(v) adjusting the output voltage setpoints of the DC/DC converter and/or BSG unit to meet high-performance, increased power requests, including:

monitoring low voltage devices powered by the low voltage battery system for high-performance, increased power requests; and increasing the output voltage setpoints of the DC/DC converter and/or BSG unit to meet the high-performance, increased power requests; and (vi) increasing the output voltage setpoint and a corresponding voltage ramping rate of the DC/DC converter for transition from an EV mode to a hybrid mode of the HEV, including:

determining the HEV is operating in the EV mode where the engine is off; and increasing the output voltage setpoint and corresponding voltage ramping rate of the DC/DC converter to provide sufficient power for an engine start when transitioning to the hybrid mode.

* * * * *